United States Patent
Deeds

[19]

[11] Patent Number: 5,111,793
[45] Date of Patent: May 12, 1992

[54] FUEL PUMP REGULATOR

[75] Inventor: Ted D. Deeds, Carson City, Nev.

[73] Assignee: Mallory, Inc., Carson City, Nev.

[21] Appl. No.: 330,483

[22] Filed: Mar. 30, 1989

[51] Int. Cl.$^5$ .................................................. F02M 39/00
[52] U.S. Cl. ................................... 123/457; 123/467; 123/510; 137/901
[58] Field of Search ............... 123/510, 467, 506, 457, 123/459; 137/505.34, 901, 539; 261/70, 69.2

[56] References Cited

U.S. PATENT DOCUMENTS

| | | | |
|---|---|---|---|
| 733,372 | 7/1903 | Colwell | 137/901 |
| 901,277 | 10/1908 | Bourne | 139/901 |
| 1,071,271 | 8/1913 | Spangler | 137/901 |
| 1,221,178 | 4/1917 | Himes | 137/901 |
| 1,336,026 | 4/1920 | Dempsey | 137/901 |
| 1,374,308 | 4/1921 | MacIsaac | 137/901 |
| 2,105,876 | 1/1938 | Birch . | |
| 2,537,347 | 1/1951 | Hieger | 261/69.2 |
| 2,633,146 | 3/1953 | Witt | 261/69.2 |
| 2,699,179 | 1/1955 | Hansen et al. . | |
| 2,777,456 | 1/1957 | Ey . | |
| 2,918,083 | 12/1959 | Clark, Jr. et al. . | |
| 2,979,067 | 4/1961 | Kern, Jr. et al. . | |
| 3,169,547 | 2/1965 | Pearl . | |
| 3,219,057 | 11/1965 | Knowles . | |
| 3,231,003 | 1/1966 | Richcreek | 123/457 |
| 3,421,547 | 1/1969 | Aslan . | |
| 3,524,469 | 8/1970 | Jebe . | |
| 3,572,387 | 3/1971 | Martelare | 261/69.2 |
| 3,741,240 | 6/1973 | Berriman | 261/20 |
| 3,938,542 | 2/1976 | Bolha . | |
| 4,186,707 | 2/1980 | Driggers | 261/69.1 |
| 4,246,876 | 1/1981 | Bouwkamp | 123/467 |
| 4,700,741 | 10/1987 | Murphy . | |

FOREIGN PATENT DOCUMENTS 664158  8/1938  Fed. Rep. of Germany ..................... 137/505.34

*Primary Examiner*—Carl Stuart Miller
*Attorney, Agent, or Firm*—Roylance, Abrams, Berdo & Goodman

[57] ABSTRACT

An improved pressure regulator for use with automotive engine fuel pumps wherein the ball is constrained for motion in a cage within the inlet chamber. The cage is made up of three simple cylindrical pins press fitted into an end cap. The inlet chamber is oversized with respect to the maximum dimensions of the caged ball array. In this manner, upon opening of the ball off of its seat, virtually no impediment to full flow of the maximum fuel pump capacity through the regulator is achieved.

34 Claims, 2 Drawing Sheets 5,111,793

FUEL PUMP REGULATOR

FIELD OF THE INVENTION

This invention relates to automotive engines. More in particular, the invention relates to a regulator to be used in conjunction with the fuel pump of such engines, and especially for high performance or high capacity engines which require correspondingly higher pressure, higher output fuel pumps.

BACKGROUND OF THE INVENTION

In many internal combustion engine applications a pressure regulator is required for use together with the fuel pump.

Among the situations wherein such regulators are required are high performance engines such as are used in racing. Such engines require a greater volume of fuel on demand than corresponding engines use for more normal applications. To provide this greater volume, a higher output pressure fuel pump must be used. Unfortunately, these higher pressure fuel pumps often operate at pressures which will overcome the check or needle valve in the carburetor and flood the engine. That is the background reason why pressure regulators such as the present invention are required.

More specifically, a fuel pump regulator is required because as the volume of fuel handled increases and the cross-sectional area in the fuel lines, of course, stays the same, the pressure must increase in order to accommodate the greater flow of fuel. As stated above, this increase in pressure, if not regulated and stepped down, will overcome the check or needle valve in the carburetor, thus completely frustrating the fuel checking action in the carburetor, and forcing fuel past the check or needle valve of the carburetor and into the carburetor at a time when no fuel is intended to be entering the carburetor, thus resulting in engine flooding.

The free flow, open throttle, pressure of a typical high performance fuel pump is often on the order of 3 psi. The shut-off pressure at the carburetor in this example situation is often on the order of 7 psi. Thus, when the engine is working at open throttle, with the pump at full capacity, there is no need for pressure regulation. The need arises as the pressure builds when the carburetor decreases or shuts-off demand, as it does at engine idle, deceleration or other routine circumstances during normal operation of internal combustion engines. On such occasions, the fuel pressure can climb to a point at which it overcomes the carburetor needle valve and floods the engine. The pressure regulator controls the action of the fuel pump in such situations in order to achieve proper and normal operation of the engine.

DISCUSSION OF THE PRIOR ART

Of course, pressure regulators in automotive environments are per se known. The invention provides improvements as to certain features in such pressure regulators. More specifically, the invention is of the ball or check valve type. It is important that the ball be constrained for motion between open, closed and intermediate positions. The prior art accomplishes this in various different manners having disadvantages overcome by the present invention.

One such common manner of controlling the motion of the ball is to provide internal integral cast ribs in the pressure regulator body to control the motion of the ball. This kind of arrangement is highly undesirable, since it has a severe restrictive effect on the flow of fuel through such regulators.

Other means to control the motion of the ball involve separate cages of various kinds. Most of these cages are made of wire, plastic, flat members formed of metal or other materials, and the like. All of these prior art cages have severe detrimental effects. They often are in contact with the walls of the chamber in which the ball moves, thus having a severe negative effect on fuel flow through the regulator. Those types of cages that are made of flat members or complex bent wire shapes not only restrict the flow, but introduce turbulence into the fuel flow, which has a negative effect on the performances of the regulator, the fuel pump, and the engine overall.

SUMMARY OF THE INVENTION

The invention is of the ball type of pressure regulator. The invention regulator adjusts the pressure by means of a diaphragm which reacts to the line pressure in the fuel lines between the fuel pump, pressure regulator and carburetor as the carburetor check or needle valve opens and closes in normal use. This line pressure cycles the diaphragm of the invention regulator towards and away from the regulator ball check seat. This motion is controlled by an adjustment spring on the diaphragm on the side thereof opposite the ball and seat. A plunger attached to the diaphragm carries a pin which physically contacts the ball to control its motion with respect to the seat. When the carburetor needle valve closes, the line pressure rises, and the spring force on the diaphragm is overcome by the line pressure. This causes the diaphragm with its plunger to move away from the ball valve, which causes the ball valve spring to seat the ball on the valve seat and stop the flow of fuel through the regulator.

The invention provides significant improvements over the state of the art in this sort of regulator.

The invention provides a cage for the ball which is made up of three simple pins which are fixed into a cap part of the regulator. The inlet chamber is made oversized with respect to these pins, and the pins provide virtually no obstruction nor do they introduce any turbulence into the flow of fuel around the ball and the cage. The pins are in effect free standing in the pressure regulator inlet chamber. The pins do not contact and in fact because of the oversized inlet chamber are spaced well away from, the walls of the inlet chamber. Thus, the fuel is allowed to flow around the pin cage with little or no restriction to the fuel flow.

More specifically, prior art pressure regulators typically can flow only approximately 70% of the full capacity of the fuel pump. In similar circumstances, the invention regulator will flow in the middle 90% range of the full capacity of the fuel pump, and under ideal conditions the invention regulator will permit flow of 98% of the free flow maximum output of the fuel pump.

It is inherent in the state of the art of fuel pump regulators that the greatest flow restriction is in the inlet chamber. The invention's provision of a flow in the inlet chamber around the caged ball on the order of the middle 90% and up to even as high as 98% of fuel pump capacity is an enormous advantage for the present invention.

Because the demands on the engines with which the invention is used are sometimes severe and rapid changing, it is possible for the invention regulator to "overshoot" as to the plunger and the pin. For example, during an abrupt closing of the carburetor needle valve the resulting back pressure can cause the diaphragm to cycle away from the ball valve seat far enough to allow the pin to escape from the seat and become wedged between the upper portion of the housing and the top of the seat. Under this condition, the regulator will no longer regulate fuel pressure. To avoid such a problem the invention includes two embodiments of means to prevent the diaphragm pin from escaping from the ball seat.

In a first preferred embodiment of the diaphragm pin, a cup-like device is provided at the end of the pin to cooperate with the ball. This cup-on-ball contact assures the operation of the ball by the pin, prevents misalignment, and, in the event of the "overshoot" situation described above, the cup end of the pin will contact the valve seat in order to prevent disengagement of the pin from its normal aligned relationship needed to operate the ball.

The second form of this part of the invention comprises a plain ended pin and an upstanding lip on the valve seat. In the event of the "overshoot" condition, the pin will contact the extending lip to prevent disengagement of the pin from its normal operating region with respect to the ball. The straight plain ended pin is deemed somewhat less desirable, but it has a slight advantage of lower cost to manufacture. This is partly made up by an increase in cost to manufacture the seat with the upstanding lip, but, the seat could be made slightly thicker to thus serve the function of the lip.

Another variation of this part of the invention includes a combination of the cup end pin of the preferred embodiment and the upstanding lip of the second embodiment.

In all cases, that is, with the use of any embodiment of the invention, by constraining the diaphragm pin to the general vicinity of its normal aligned relation with the ball, an added advantage of automatic correction is obtained. That is, when the condition which caused the "overshoot" is relieved, then the parts will return to their normal operating positions, and that is so for all embodiments of the diaphragm pin described above.

The above and other advantages of the present invention will present themselves to those skilled in the art from a detailed study of the following description which should be read in conjunction with the accompanying drawing which also forms part of this disclosure.

DETAILED DESCRIPTION OF THE PREFERRED EMBODIMENT

Figure 1:
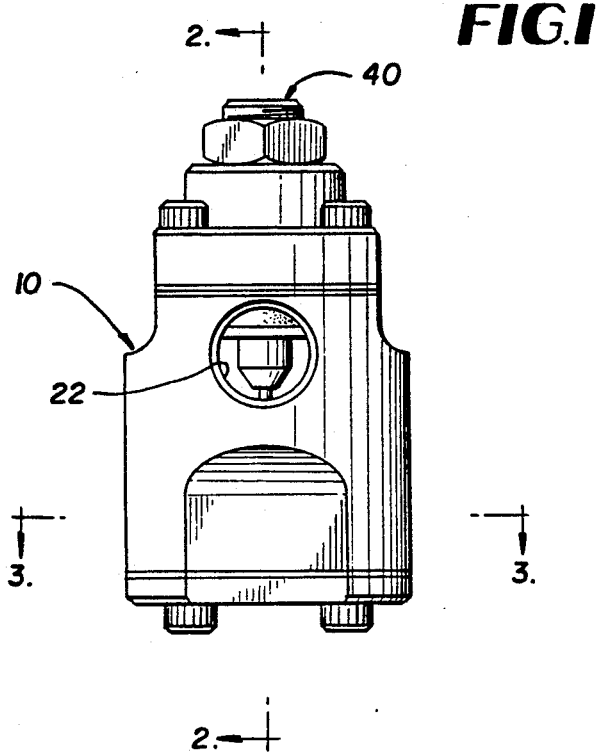
FIG. 1 is an overall external showing of a pressure regulator embodying the invention.

FIG. 1 shows a vertical elevational view of the regulator of the invention. Means, not shown, will be provided to mount the invention regulator 10 to an automobile or other point of use, in a manner and using means well known to those skilled in these arts.

Figure 2:
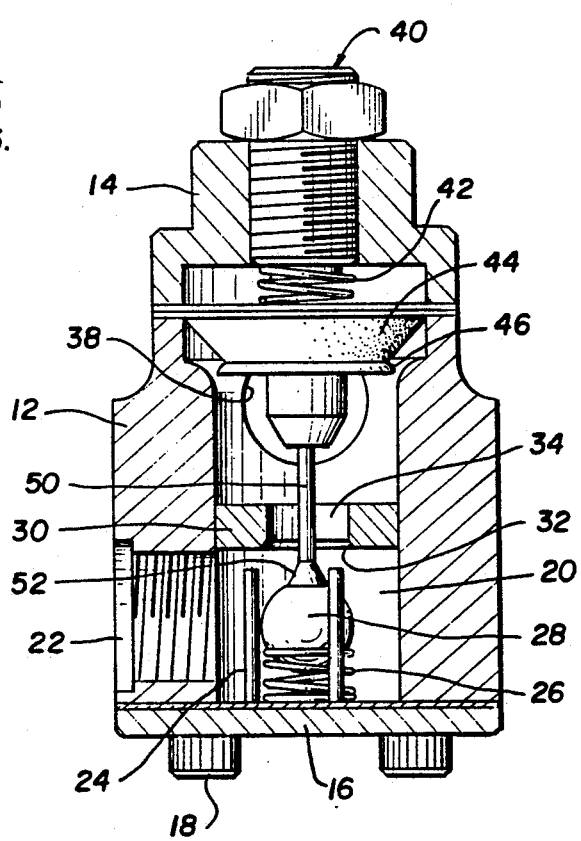
FIG. 2 is a vertical cross-sectional view taken on line 2—2 of FIG. 1.

Referring now to FIG. 2, the invention fuel regulator 10 comprises a main body 12, a diaphragm end cap 14, and a ball seat end cap 16. Screws 18 are provided to hold cap 16 on the body 12, and similar screws not shown or other such means are provided to hold cap 14 on body 12 at the other end.

The body 12 is formed with an enlarged inlet chamber 20 into which fuel is delivered via an inlet port 22. Conduit means, not shown, are attached to inlet port 22.

Figure 3:
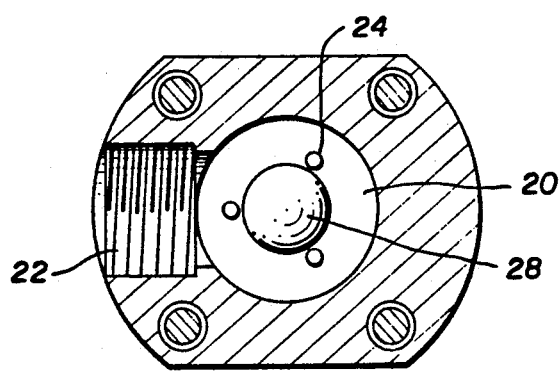
FIG. 3 is a horizontal cross-sectional view taken on line 3—3 of FIG. 1.

A set of three pins 24 are press fitted into suitably formed openings in the end cap 16, and extend in a regular triangular array into the inlet chamber 20. A spring 26 urges a valve member in the form of a ball 28 upwardly as shown in FIG. 2. The ball is constrained for motion inside the cage defined by the three pins 24. As is clear from FIG. 3, the three pins 24 are arranged at a spacing of about 120° around the line of motion of the ball 28 with respect to the valve seat 32.

Of course, if it should be desired or deemed necessary for any reason, the pin array could number four or five or even more of the pins 24.

As is well known to those skilled in these arts, the strengths of ball spring 26 and of diaphragm spring 42 described below are selected with respect to the particular fuel pump and carburetor and their operating pressures in use so as to produce the manner of operation set forth herein.

The upper end of the inlet chamber 20 as seen in FIG. 2 is defined by a ball seat member 30. At its underside, at the lower end of a through passageway 34, ball seat member 30 is formed with a valve seat portion 32. Ball seat member 30 is preferably made of a softer material such as grade 660 bronze. Further, its external surface where it bears against the wall of the inlet chamber 20 is preferably knurled so as to provide a tight press fit and fluid tight seal between the ball seat member 30 and the inside wall of the main body 12, to thus define the inlet chamber 20.

As thus far described, and especially with reference to FIGS. 2 to 5, it can be seen that the inlet chamber 20 is considerably oversized with respect to the maximum dimensions of the caged ball assembly 24, 26 and 28. This provides critically important advantages for the present invention. First of all, cost of manufacture is greatly reduced in that three simple pins, which can be commercially available roll pins, can be used and the assemblage is produced by simply press fitting the ends of these pins of predetermined length into suitably formed openings in the cap 16. Further, and more importantly, the ball when moved from the no flow position of FIG. 4 to the flow position of FIG. 2, provides virtually no impediment to the flow of fuel through the invention regulator from the inlet port 22 to the outlet port 38. Outlet port 38 is similar to inlet port 22, and it is also connected to conduit means not shown to fit the invention regulator 10 for use with a fuel pump and engine in the conventional matter.

In the successfully constructed embodiment of the invention, the diameter of the inlet chamber 20 was $\frac{5}{8}$ inch, the diameter of pins 24 was 1/16 inch each, and the diameter of the ball 28 was 13/32. Subtracting the area of the pins and ball from the chamber area, it can be seen that the ball and pin array occupies 45.3% of the flow area. This means 54.7% of the chamber is unrestricted flow area. Therefore, it can be seen that due to the oversized chamber and the relatively small area taken up by the ball and pin array, the valve assembly is sufficiently small that it offers no significant impediment to the flow of fuel through inlet chamber 20. The calculations are as follows, where A=the area occupied by pins 24 and ball 28, and B=the area of inlet chamber 20;

$$A = [(0.625/2)^{2\pi}] - [(0.062/2)^2 \pi]3 + (0.406/2)^{2\pi}] = 0.168 in^2$$

$$B = (0.625/2)^{2\pi} = 0.307 in^2$$

%Free flow area=54.7%

Figure 4:
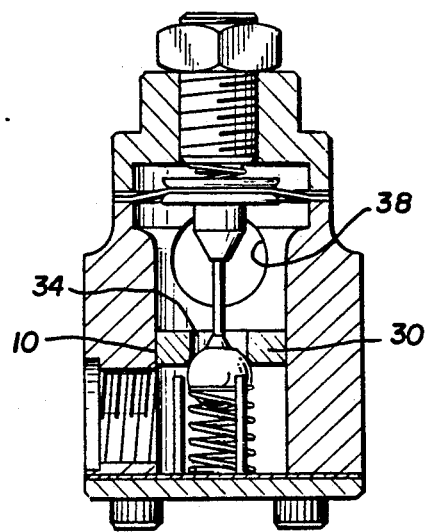
FIG. 4 is a view similar to FIG. 2 showing the ball seated, no flow conditions.

Means are provided to cause operation of ball 28 with respect to valve seat portion 32 between the FIGS. 2 and 4 positions, as is normally required by usage of the invention regulator with a carburetor in an internal combustion engine. To this end, the diaphragm end cap 14 is provided with an adjusting screw and nut arrangement 40 which controls the tension on a spring 42 which is constrained between the diaphragm 44 and the end of the screw 40.

On the side of diaphragm 44 opposite spring 42 and facing ball seat member 30, the diaphragm assembly includes a mounting plate 46 which is used to join a plunger 48 to the diaphragm. Plunger 48 carries a diaphragm pin 50 which reaches through the passageway 34 and bears against the ball 28 to control the opened and closed conditions of the pressure regulator as shown in FIGS. 2 and 4. The free end of diaphragm pin 50 carries a cup like member 52 which fits snuggly against the operating ball 28. This arrangement assures more certain contact between diaphragm pin 50 and ball 28, helps prevent the diaphragm pin 50 from sliding off of the ball, and helps in the event of overtravel, as described below. Further, the engagement between the cup 52 and the ball 28 assures self alignment between the diaphragm pin 50 and the ball 28 back to the normal line of motion of the diaphragm pin 50 and ball 28.

Figure 5:
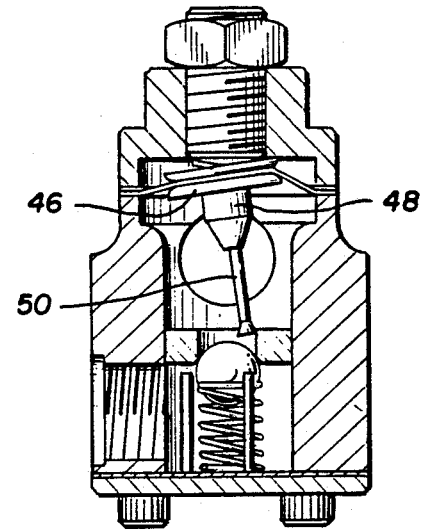
FIG. 5 is a view similar to FIG. 2 showing the overtravel situation with the diaphragm pin in contact with the valve seat.

FIG. 5 shows an overtravel condition as can sometimes be produced due to the harsh demands on the engine made in the performance environment and in turn passed on to the regulator 10. These extreme conditions can cause the undesirable effect of pulling diaphragm pin 50 out of contact with the ball seat member 30 and causing it to cock with respect to the normal line of motion of the diaphragm pin 50 and ball 28. As is clear from FIG. 5, in the event of such overtravel, the cup portion 52 will engage against the upper edge of the passageway 34 through the ball seat member 30 to prevent complete disengagement of the diaphragm pin 50 from the ball seat member 30.

Figure 6:
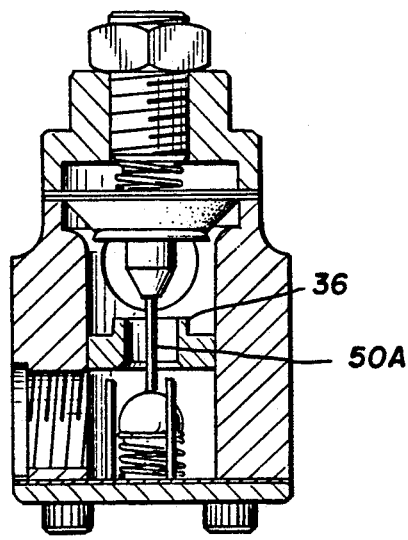
FIGS. 6 and 7 are views similar to FIGS. 4 and 5 respectively showing a second embodiment of the diaphragm pin and valve seat arrangement.
Figure 7:
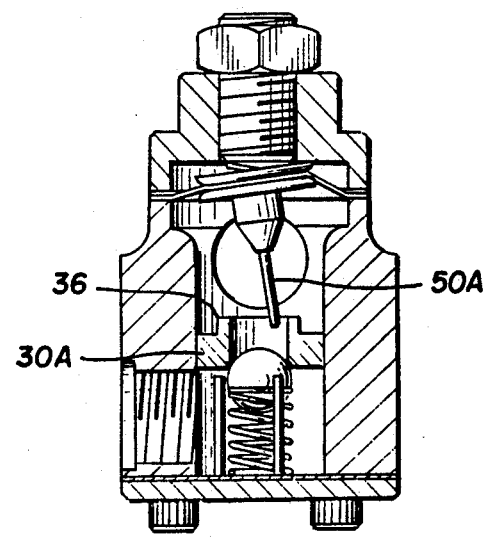

Referring to FIGS. 6 and 7, a second embodiment of the invention is shown. In this embodiment, the ball seat member 30A is formed with an annular upstanding lip 36. The lip 36, in the event of the undesirable overtravel condition, makes a point contact between the diaphragm pin 50A and the lip 36 to prevent sticking, jamming, or the like as could be caused in such a severe demand condition.

Of course, if it should be desired for any reason, another embodiment of the invention using the cup ended diaphragm pin 50 and cup like member 52 of the first embodiment in combination with the ball seat member 30A with the lip 36 of the second embodiment could also be provided.

After the cause of the overtravel is relieved, the parts will return to the FIG. 2, FIG. 4 or FIG. 6 position and resume normal operation automatically. This highly desirable manner of operation, that is an automatic return to the normal operating mode of FIG. 2, FIG. 4 or FIG. 6, will exist with all embodiments of the invention. This is another improvement over the prior art obtained by the pressure regulator of the invention.

The invention has been described in the environment of a pressure regulator particularly adapted for use with the fuel pump of internal combustion engines. However, as will be clear from the above to those skilled in these arts, the invention is not so limited, and will find general applicability in other environments, such as in check valves which are used generally in many arts and technologies.

While the invention has been described in some detail above, it is to be understood that this detailed description is by way of example only, and the protection granted is to be limited only within the spirit of the invention and the scope of the following claims.

What is claimed is:

1. In a fluid flow control valve, the combination comprising valve body means, at least one chamber formed within said valve body means, said chamber being defined at least in part by a valve seat member, a ball seal member located in said chamber and adapted for motion on a line to seal and unseal with respect to said valve seat member to thereby control the flow of fluid through said chamber, means to control the motion of said ball member on said line in said chamber with respect to said valve seat member, said motion controlling means comprising a plurality of pins fixed to said body means and extending substantially parallel to said line of motion of said ball member, the volume within said chamber occupied by said pins and said ball member being sufficiently less than the total volume of said chamber and the cross-sectional area of said pins being sufficiently less than the cross-sectional area of said chamber that when said ball member is unsealed with respect to said valve seat member said pins provide substantially no impediment to fluid flow through chamber and the impediment to flow through said chamber created by said ball member is reduced, wherein said fluid flow control valve is part of a pressure regulator for use with a fuel pump of an internal combustion engine, said pressure regulator being positioned in the fuel flow path between said fuel pump and the carburetor of said engine, said chamber comprising an inlet chamber of said pressure regulator, said regulator further comprising spring loaded diaphragm means, spring means normally urging said ball member into sealing engagement with said valve seat member, said diaphragm means being located in said valve body means on the opposite side of said valve seat member from said ball member; said diaphragm means including means extending into said valve seat member contacting said ball member and adapted to unseal said ball member from said valve seat member; and means to expose said diaphragm means to the changes in pressure in said fuel flow path from said regulator to said carburetor.

2. The combination of claim 1, said diaphragm means extending means comprising pin means extending into said valve seat member, said pin means being formed with a cup portion on the end thereof normally in contact with said ball member, and said valve seat member and said pin means and said cup portion of said pin means being so positioned, sized and configured with respect to each other that in the event of overtravel of said diaphragm means resulting in a cocking of said pin means off of said line of motion of said ball member then said valve seat member and said pin means cup portion will come into contact with each other in a way which will automatically permit resumption of normal functioning of said pressure regulator after the cause of said diaphragm means overtravel is relieved.

3. The combination of claim 1, said valve seat member having lip means extending towards said diaphragm means, said diaphragm means extending means comprising pin means extending into said lip means and said valve seat member, and said lip means and said pin means being so positioned, sized and configured with respect to each other that in the event of overtravel of said diaphragm means resulting in a cocking of said pin means off of said line of motion of said ball member than said lip means and said pin means will come into contact with each other in a way which will permit automatic resumption of normal functioning of said pressure regulator after the cause of said diaphragm means overtravel is relieved.

4. The combination of claim 1, said valve seat member having lip means extending towards said diaphragm means, said diaphragm means extending means comprising pin means extending into said valve seat member, said pin means being formed with a cup portion on the end thereof normally in contact with said ball member, and said valve seat member, said lip means ,said pin means and said cup portion of said pin means being so positioned, sized and configured with respect to each other that in the event of overtravel of said diaphragm means resulting in a cocking of said pin means off of said line of motion of said ball member then said lip means and said pin means cup portion will come into contact with each other in away which will automatically permit resumption of normal functioning of said pressure regulator after the cause of said diaphragm means overtravel is relieved.

5. The combination of claim 1, wherein said ball member and said pins occupy less than one-third the volume of said chamber based the cross-sectional area of said chamber, of said ball member, and of said pins.

6. The combination of claim 1, wherein said plurality of pins consist of three such pins positioned in a generally circular array and spaced at about 120° apart around said line of motion of said ball member.

7. In a diaphragm operated valve device, the combination comprising diaphragm means, a valve member and a cooperable valve seat, said diaphragm means and said valve member being located on opposite sides of said valve seat, said diaphragm means including means extending into an opening formed by said valve seat and into operative contact with said valve member, said diaphragm means extending means comprising pin means extending towards said valve seat, said valve seat and said pin means being so positioned, sized and configured with respect to each other that in the event of overtravel of said diaphragm means then said pin means will be prevented from withdrawing from said valve seat and will automatically resume normal operation of said device after the cause of said diaphragm means overtravel is relieved, wherein said device is part of a pressure regulator for use with a fuel pump for an internal combustion engine, said pressure regulator being positioned in the fuel flow path between said fuel pump and the carburetor of said engine, said pressure regulator comprising a body, means defining an inlet chamber of said pressure regulator in said body, said diaphragm means comprising spring loaded diaphragm means, said valve member comprising a ball member, spring means normally urging said ball member into sealing engagement with said valve seat, said diaphragm means being located in said body on the opposite side of said valve seat from said ball member for moving said ball member to seal and unseal with respect to said valve seat independently of changes in manifold vacuum pressure and in response to changes in pressure in said fuel flow path from said regulator to said carburetor, and means to expose said diaphragm means to the changes in pressure in said fuel flow path from said regulator to said carburetor.

8. The device of claim 7, said valve seat comprising lip means extending toward said diaphragm means, and said pin means being of a substantially constant cross-sectional shape throughout its length.

9. The device of claim 7, said valve member comprising a ball member, and said pin means comprising a cup portion on the operating end thereof most distal from said diaphragm means for cooperation with said ball member.

10. The device of claim 7, said valve seat comprising lip means extending toward said diaphragm means, and said pin means comprising a cup portion on the operating end thereof most distal from said diaphragm means for cooperation with said ball member.

11. The device of claim 7, said inlet chamber being defined at least in part by said valve seat, said ball member located in said inlet chamber and adapted to move on a line to seal and unseal with respect to said valve seat to thereby control the flow of fluid through said inlet chamber, means to control the motion of said ball member on said line in said inlet chamber with respect to said valve seat, said motion controlling means comprising a plurality of pins fixed to said body and extending substantially parallel to said line of motion of said ball member, and the volume within said inlet chamber occupied by said pins and said ball member being sufficiently less than the total volume of said inlet chamber and the cross-sectional area of said pins being sufficiently less than the cross-sectional area of said inlet chamber that when said ball member is unsealed with respect to said valve seat said pins provide substantially no impediment to fluid flow through said inlet chamber and the impediment to flow through said inlet chamber created by said ball member is reduced.

12. The combination of claim 11, wherein said ball member and said pins occupy less than one-third the volume of said chamber based on the cross-sectional area of said chamber, of said ball member, and of said pins.

13. The combination of claim 11, wherein said plurality of pins consist of three such pins positioned in a generally circular array and spaced at about 120° apart around said line motion of said ball member.

14. In a fluid flow control valve, the combination comprising valve body means, at least one chamber formed within said valve body means, said chamber being defined at least in part by a valve seat member, a ball seal member located in said chamber and adapted for motion on a line to seal and unseal with respect to said valve seat member to thereby control the flow of fluid through said chamber, means to control the motion of said ball member on said line in said chamber with respect to said valve seat member, said motion controlling means comprising a plurality of pins extending substantially parallel to said line of motion of said ball member, the volume within said chamber occupied by said pins and said ball member being sufficiently less than the total volume of said chamber and the cross-sectional area of said pins being sufficiently less than the cross-sectional area of said chamber that when said ball member is unsealed with respect to said valve seat member said pins provide substantially no impediment to fluid flow through said chamber and the impediment to flow through said chamber created by said ball member is reduced, wherein said fluid flow control valve is part of a pressure regulator for use with a fuel pump of an internal combustion engine, said pressure regulator being positioned in the fuel flow path between said fuel pump and the carburetor of said engine, said chamber comprising an inlet chamber of said pressure regulator, said regulator further comprising spring loaded diaphragm means, spring means normally urging said ball member towards sealing engagement with said valve seat member, said diaphragm means being located in said valve body means on the opposite side of said valve seat member from sad ball member; means, cooperable with said diaphragm means, extending into said valve seat member for contacting said ball member and adapted to unseal said ball member from said valve seat member; and means to expose said diaphragm means to the changes in pressure in said fuel flow path from said regulator to said carburetor.

15. The combination of claim 14, said means cooperable with said diaphragm means comprising pin means extending into said valve seat member, said pin means being formed with a cup portion on the end thereof normally in contact with said ball member, and said valve seat member and said pin means and said cup portion of said pin means being so positioned, sized and configured with respect to each other that in the event of overtravel of said diaphragm means resulting in a cocking of said pin means off of said line of motion of said ball member then said valve seat member and said pin means cup portion will come into contact with each other in a way which will automatically permit resumption of normal functioning of said pressure regulator after the cause of said diaphragm means overtravel is relieved.

16. The combination of claim 14, said valve seat member having lip means extending towards said diaphragm means, said means cooperable with said diaphragm means comprising pin means extending into said lip means and said valve seat member, and said lip means and said pin means being so positioned, sized and configured with respect to each other that in the event of overtravel of said diaphragm means resulting in a cocking of said pin means off of said line of motion of said ball member than said lip means and said pin means will come into contact with each other in a way which will permit automatic resumption or normal functioning of said pressure regulator after the cause of said diaphragm means overtravel is relieved.

17. The combination of claim 14, said valve seat member having lip means extending towards said diaphragm means, said means cooperable with said diaphragm means comprising pin means extending into said valve seat member, said pin means being formed with a cup portion on the end thereof normally in contact with said ball member, and said valve seat member, said lip means, said pin means and said cup portion of said pin means being so positioned, sized and configured with respect to each other that in the event of overtravel of said diaphragm means resulting in a cocking of said pin means off of said line of motion of said ball member then said lip means and said pin means cup portion will come into contact with each other in a way which will automatically permit resumption of normal functioning of said pressure regulator after the cause of said diaphragm means overtravel is relieved.

18. The combination of claim 14, wherein said ball member and said pins occupy less than one-third the volume of said chamber based the cross-sectional area of said chamber, of said ball member, and of said pins.

19. The combination of claim 14, wherein said plurality of pins contacts of three such pins positioned in a generally circular array and spaced at about 120° apart around said line of motion of said ball member.

20. A pressure regulator for use with a fuel pump of an internal combustion engine, said pressure regulator being positioned in the fuel flow path between said fuel pump and the carburetor of said engine, the combination comprising valve body means, at least one chamber found within said valve body means, said chamber being defined at least in part by a valve seat member, a ball seal member located in said chamber and adapted for motion on a line to seal and unseal with respect to said valve seat member to thereby control the flow of fluid through said chamber, means to control the motion of said ball member on said line in said chamber with respect to said valve seat member, and operating means, operatively coupled to said ball member, for moving said ball member to seal and unseal with respect to said valve seat member independently of changes in manifold vacuum pressure and in response to changes in pressure in the fluid flow, said chamber comprising an inlet chamber of said pressure regulator, and the volume within said chamber occupied by said motion control means and said ball member being sufficiently less than the total volume of said chamber and the cross-sectional area of said motion control means being sufficiently less than the cross-sectional area of said chamber that when said ball member is unsealed with respect to said valve seat member said motion control means provide substantially no impediment to fluid flow through said chamber and the impediment to flow through said chamber created by said ball member is reduced.

21. A pressure regulator for use with a fluid pump of an internal combustion engine, said pressure regulator being positioned in the fuel flow path between said fuel pump and the carburetor of said engine, the combination comprising valve body means, at least one chamber found within said valve body means, said chamber being defined at least in part by a valve seat member, a ball seal member located in said chamber and adapted for motion on a line to seal and unseal with respect to said valve seat member to thereby control the flow of fluid through said chamber, means to control the motion of said ball member on said line in said chamber with respect to said valve seat member, and operating means, operatively coupled to said ball member, for moving said ball member to seal and unseal with respect to said valve seat member upon changes in pressure in the fluid flow, said chamber comprising an inlet chamber of said pressure regulator, and the volume within said chamber occupied by said motion control means and said ball member being sufficiently less than the total volume of said chamber and the cross-sectional area of said motion control means being sufficiently less than the cross-sectional area of said chamber that when said ball member is unsealed with respect to said valve seat member said motion control means provide substantially no impediment to fluid flow through said chamber and the impediment to flow through said chamber created by said ball member is reduced, said motion control means comprising a plurality of pins extending substantially parallel to said line of motion of said ball member.

22. The combination of claim 20, said operating means comprising spring loaded diaphragm means, spring means normally urging said ball member towards sealing engagement with said valve seat member, said diaphragm means being located in said valve body means on the opposite side of said valve seat member from said ball member; means cooperable with said diaphragm means extending through said valve seat member into contact with said ball member and adapted to unseal said ball member from said valve seat member; and means to expose said diaphragm means to the changes in pressure in said fuel flow path from said regulator to said carburetor.

23. The combination of claim 22, said means cooperable with said diaphragm means comprising pin means extending into said valve seat member and said pin means being formed with a cup portion on the end thereof normally in contact with said ball member, said valve seat member and said pin means and said cup portion being so positioned, sized and configured with respect to each other that in the event of overtravel of said diaphragm means resulting in a cocking of said pin means off of said line of motion of said ball member then said valve seat member and said cup portion will come into contact with each other in a way which will automatically permit resumption of normal functioning of said pressure regulator after the cause of said diaphragm means overtravel is relieved.

24. The combination of claim 22, said valve seat member having lip means extending towards said diaphragm means, said means cooperable with said diaphragm means comprising pin means extending through said lip means and said valve seat member, said lip means and said pin means being so positioned, sized and configured with respect to each other that in the event of overtravel of said diaphragm means resulting in a cocking of said pin means off of said line of motion of said ball member then said valve seat member and said pin means will come into contact with each other in a way which will automatically permit resumption of normal functioning of said pressure regulator after the cause of said diaphragm means overtravel is relieved.

25. The combination of claim 22, said valve seat member having lip means extending towards said diaphragm means, said means cooperable with said diaphragm means comprising pin means extending through said lip means and said valve seat member, and said lip means and said pin means being so positioned, sized and configured with respect to each other that in the event of overtravel of said diaphragm means resulting in a cocking of said pin means off of said line of motion of said ball member then said valve seat member and said pin means cup portion will come into contact with each other in a way which will automatically permit resumption of normal functioning of said pressure regulator after the cause of said diaphragm means overtravel is relieved.

26. The combination of claim 20, wherein said ball member and said motion control means occupy less than one-third the volume of said chamber based on the cross-sectional area of said chamber, of said ball member, and of said ball member motion control means.

27. A pressure regulator for use with a fuel pump of an internal combustion engine said pressure regulator being positioned in the fuel flow path between said fuel pump and the carburetor of said engine, the combination comprising valve body means, at least one chamber found within said valve body means, said chamber being defined at least in part by a valve seat member, a ball seal member located in said chamber and adapted for motion on a line to seal and unseal with respect to said valve seat member to thereby control the flow of fluid through said chamber, means to control the motion of said ball member on said line in said chamber with respect to said valve seat member, and operating means, operatively coupled to said ball member, for moving said ball member to seal and unseal with respect to said valve seat member upon changes in pressure in the fluid flow, said chamber comprising an inlet chamber of said pressure regulator, and the volume within said chamber occupied by said motion control means and said ball member being sufficiently less than the total volume of said chamber and the cross-sectional area of said motion control means being sufficiently less than the cross-sectional area of said chamber that when said ball member is unsealed with respect to said valve seat member said motion control means provide substantially no impediment to fluid flow through said chamber and the impediment to flow through said chamber created by said ball member is reduced said motion control means comprising three pins positioned generally parallel to said line of motion and in a generally circular array and spaced at about 120° apart around said line of motion.

28. A pressure regulator for use with a fuel pump of an internal combustion engine, said pressure regulator being positioned in the fuel flow path between said fuel pump and the carburetor of said engine, the combination comprising valve body means, at least one chamber formed within said valve body means, said chamber being defined at least in part by a valve seat member, a seal member located in said chamber and adapted for motion on a line to seal and unseal with respect to said valve seat member to thereby control the flow of fluid through said chamber, means to control the motion of said seal member on said line in said chamber with respect to said valve seat member, and operating means, operatively coupled to said seal member, for moving said seal member to seal and unseal with respect to said valve seat member independently of changes in manifold vacuum pressure and in response to changes in pressure in the fluid flow, said chamber comprising an inlet chamber of said pressure regulator, and the volume within said chamber occupied by said motion control means and said seal member being sufficiently less than the total volume of said chamber and the cross-sectional area of said motion control means being sufficiently less than the cross-sectional area of said chamber that when said seal member is unsealed with respect to said valve seat member said motion control means provide substantially no impediment to fluid flow through said chamber and the impediment to flow through said chamber created by said seal member is reduced.

29. The combination of claim 28, said seal member comprising a ball.

30. A pressure regulator for use with a fuel pump of an internal combustion engine, said pressure regulator being positioned in the fuel flow path between said fuel pump and the carburetor of said engine, the combination comprising valve body means, at least one chamber formed within said valve body means, said chamber being defined at least in part by a valve seat member, a seal member located in said chamber and adapted for motion on a line to seal and unseal with respect to said valve seat member to thereby control the flow of fluid through said chamber, means to control the motion of said seal member on said line in said chamber with respect to said valve seat member, and operating means, operatively coupled to said seal member, for moving said seal member to seal and unseal with respect to said valve seat member upon changes in pressure in the fluid flow, said chamber comprising an inlet chamber of said pressure regulator, and the volume within said chamber occupied by said motion control means and said seal member being sufficiently less than the total volume of said chamber and the ross-sectional area of said motion control means being sufficiently less than the cross-sectional area of said chamber that when said seal member is unsealed with respect to said valve seat member said motion control means provide substantially no impediment to fluid flow through said chamber and the impediment to flow through said chamber created by said seal member is reduced, said seal member being a ball seat member, said motion control means comprising a plurality of pins extending substantially parallel to said line of motion of said ball seal member.

31. The combination of claim 28, said operating means comprising spring loaded diaphragm means, spring means normally urging said seal member towards sealing engagement with said valve seat member, said diaphragm means being located in said valve body means on the opposite side of said valve seat member from said seal member; means cooperable with said diaphragm means extending through said valve seat member into contact with said seal member and adapted to unseal said seal member from said valve seat member; and means to expose said diaphragm means to the changes in pressure in said fuel flow path from said regulator to said carburetor.

32. The combination of claim 31, said valve seat member having lip means extending towards said diaphragm means, said means cooperable with said diaphragm means comprising pin means extending through said lip means and said valve seat member, and said lip means and said pin means being so positioned, sized and configured with respect to each other that in the event of overtravel of said diaphragm means resulting in a cocking of said pin means off of said line of motion of said seal member then said value seat member and said pin means will come into contact with each other in a way which will automatically permit resumption of normal functioning of said pressure regulator after the cause of said diaphragm means overtravel is relieved.

33. The combination of claim 28, wherein said seal member and said motion control means occupy less than one-third the volume of said chamber based on the cross-sectional area of said chamber, of said seal member, and of said motion control means.

34. The combination of claim 28, said motion control means being so configured and arranged in said chamber that said motion control means together with said seal member contribute to said substantially unimpeded fluid flow through said chamber when said seal member is unsealed with respect to said valve seat member.

* * * * *

UNITED STATES PATENT AND TRADEMARK OFFICE
CERTIFICATE OF CORRECTION

PATENT NO. : 5,111,793
DATED : May 12, 1992
INVENTOR(S) : Ted D. Deeds

It is certified that error appears in the above-identified patent and that said Letters Patent is hereby corrected as shown below:

Column 1, line 46, "shuts-off" should be -- shuts off --.
Column 2, line 47, after "contact" insert --,-- (a comma).
Column 5, lines 12 - 15, the formula should be:

$$A = [(.625/2)^2 \pi] - [((.062/2)^2 \pi)3 + (.406/2)^2 \pi] = .168 in^2$$

$$B = (.625/2)^2 \pi = .307 in^2$$

Column 6, line 6, after "is" insert --,-- (a comma)
Claim 4, column 7, line 39, "away" should be --a way--.
Claim 5, column 7, line 45, after "based" insert --on--.
Claim 6, column 7, line 48, "consist" should be --consists--.
Claim 11, column 8, line 34, after "ber" insert --being--.
Claim 13, column 8, line 58, "consist" should be --consists--.
Claim 18, column 10, line 13, after "based" insert --on--.
Claim 19, column 10, line 16, "contacts" should be --consists--.
Claim 20, column 10, line 24, "found" should be --formed--.
Claim 20, column 10, line 44, "provide" should be --provides--.
Claim 21, column 10, line 48, "fluid" should be --fuel--.
Claim 21, column 10, line 53, "found" should be --formed--.
Claim 21, column 11, line 4, "provide" should be --provides--.
Claim 25, column 11, line 58, after "member," insert --said pin means being formed with a cup portion on the end thereof normally in contact with said ball member--.
Claim 27, column 12, line 11, "found" should be --formed--.
Claim 27, column 12, line 30, "provide" should be --provides--.
Claim 28, column 12, line 63, "provide" should be --provides--.
Claim 30, column 13, line 21, "ross-sectional" should be --cross-sectional--.
Claim 30, column 13, line 25, "provide" should be --provides--.

UNITED STATES PATENT AND TRADEMARK OFFICE
CERTIFICATE OF CORRECTION

PATENT NO. : 5,111,793

DATED : May 12, 1992

INVENTOR(S) : Ted D. Deeds

It is certified that error appears in the above-identified patent and that said Letters Patent is hereby corrected as shown below:

```
Claim 30, column 13, line 28, "seat" should be --seal--.
Claim 30, column 13, line 29, after " member ," insert --and--.
Claim 32, column 14, line 19, "value" should be --valve--.
```

Signed and Sealed this

Tenth Day of May, 1994

Attest:

BRUCE LEHMAN

*Attesting Officer*     *Commissioner of Patents and Trademarks*